C. B. BILLINGHURST.
SHOCK CONTROLLER.
APPLICATION FILED JUNE 6, 1919.
1,330,512.
Patented Feb. 10, 1920.
3 SHEETS—SHEET 1.
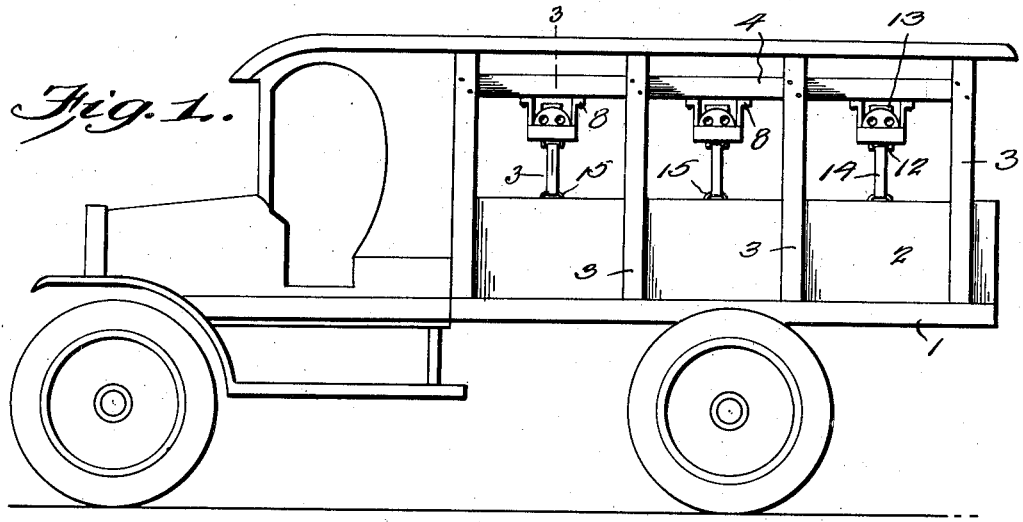
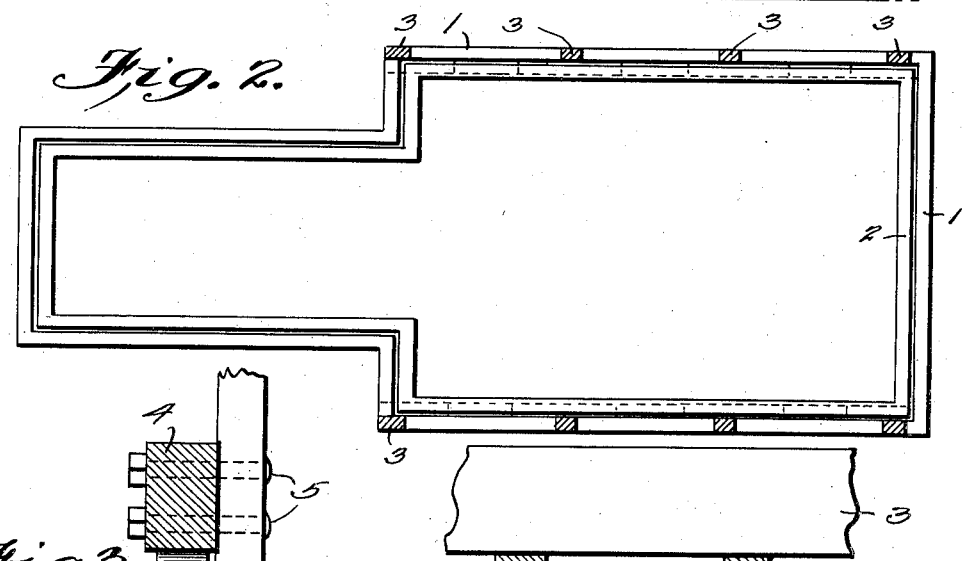
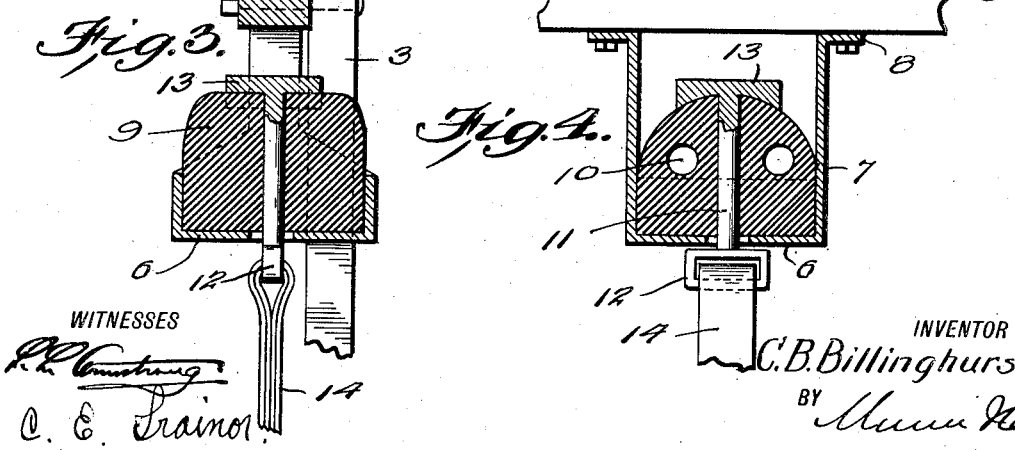
WITNESSES
INVENTOR
C. B. Billinghurst,
BY
ATTORNEYS

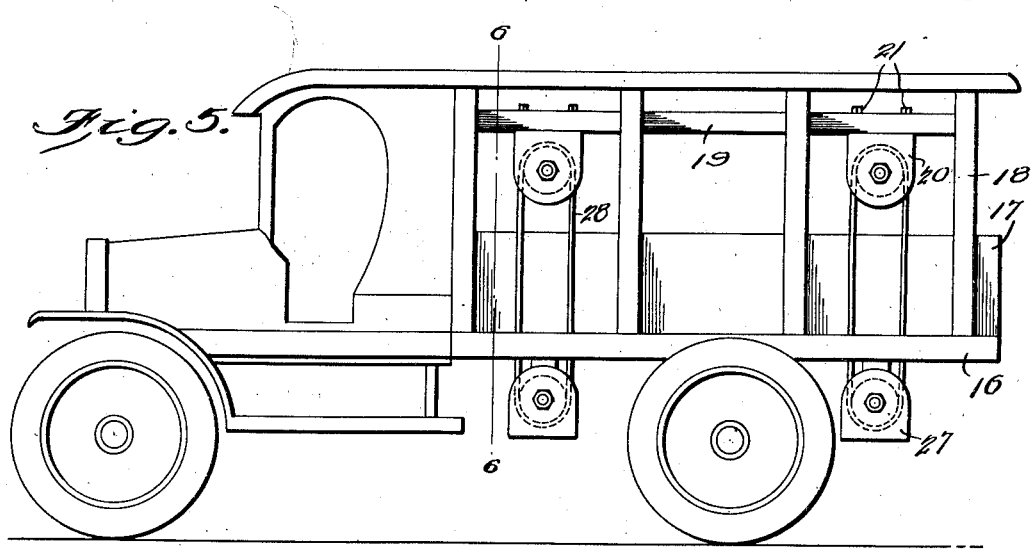
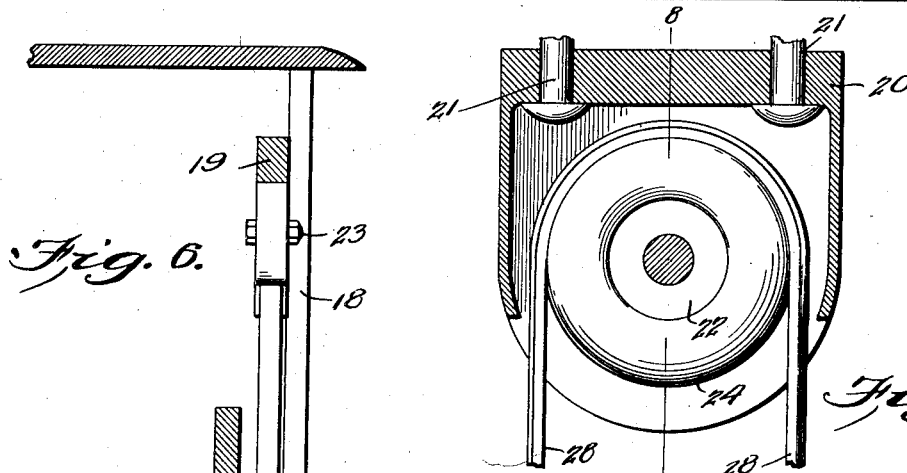
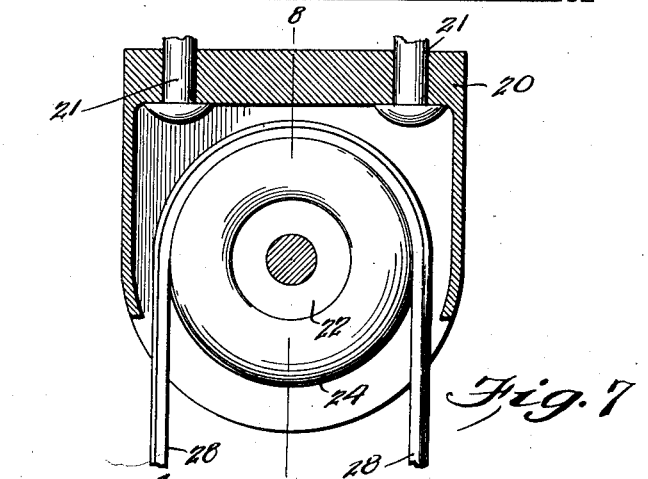
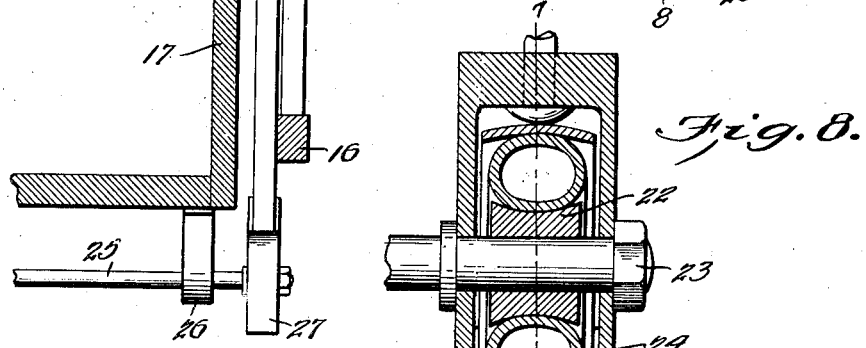

C. B. BILLINGHURST.
SHOCK CONTROLLER.
APPLICATION FILED JUNE 6, 1919.

1,330,512.

Patented Feb. 10, 1920.
3 SHEETS—SHEET 3.

WITNESSES

INVENTOR
C. B. Billinghurst
BY
ATTORNEYS

UNITED STATES PATENT OFFICE.

CHARLES B. BILLINGHURST, OF PIERRE, SOUTH DAKOTA.

SHOCK-CONTROLLER.

1,330,512.  Specification of Letters Patent.  Patented Feb. 10, 1920.

Application filed June 6, 1919.  Serial No. 302,267.

*To all whom it may concern:*

Be it known that I, CHARLES B. BILLINGHURST, a citizen of the United States, and a resident of Pierre, in the county of Hughes and State of South Dakota, have invented certain new and useful Improvements in Shock-Controllers, of which the following is a specification.

My invention is an improvement in shock controllers, and has for its object to provide mechanism to be arranged between the chassis and the body of the motor vehicle, for eliminating shock and jar, the said mechanism consisting of flexible, non-metallic, partly-elastic connections, which break the metallic connection between the chassis and the body.

In the drawings:

Figure 1 is a side view of a motor vehicle provided with the improvement;

Fig. 2 is a horizontal section showing the relative position of the frame;

Fig. 3 is a section on the line 3—3 of Fig. 1;

Fig. 4 is a view at right angles to Fig. 3;

Fig. 5 is a side view showing another embodiment of the invention;

Fig. 6 is a section on the line 6—6 of Fig. 5;

Fig. 7 is a section on the line 7—7 of Fig. 8;

Fig. 8 is a section on the line 8—8 of Fig. 7;

Figure 9:
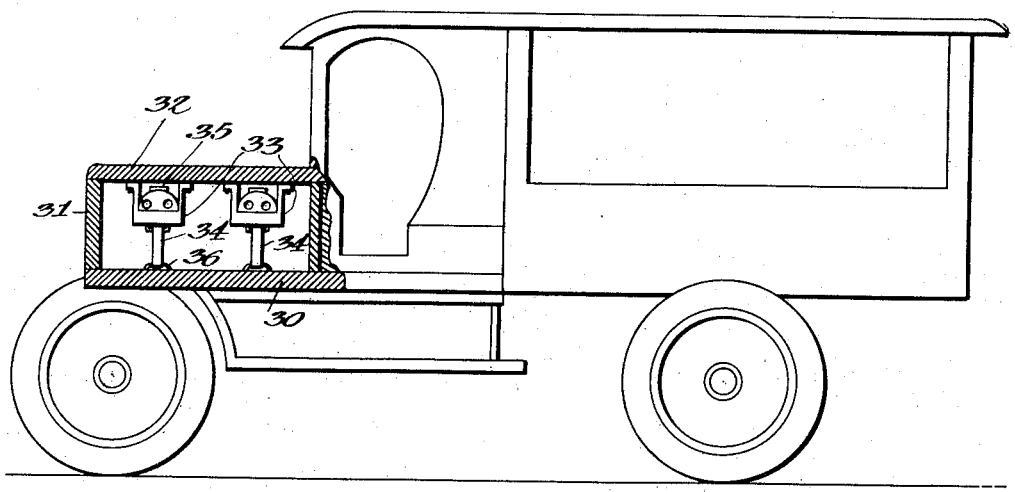
Fig. 9 is a view similar to Figs. 1 and 5, showing the arrangement at the front of the vehicle.

In the embodiment of the invention shown in Figs. 1 to 4, inclusive, an outer frame 1 is provided and an inner frame 2, the inner frame carrying the body and being seated loosely within the outer frame and cushioned against the outer frame by any suitable means, as, for instance, by the cushions shown in my prior Patent No. 1,216,931, granted February 20, 1917.

A series of pillars 3 is secured to the outer frame at each side thereof, and the said pillars are connected near their top by longitudinally extending bars 4, the said bars being secured to the inner faces of the pillars in any suitable or desired manner, as, for instance, by bolts, as shown at 5 in Fig. 3. The springs are arranged between the outer frame and the chassis of the vehicle in the usual manner.

The inner frame is supported from the outer frame by means of shock absorbing devices shown more particularly in Figs. 3 and 4. Each of these devices comprises a substantially U-shaped holder comprising a body 6 and arms 7, each of which has outwardly extending lugs 8 at the ends of its arms, and these lugs are secured to the adjacent cross bar 4.

A block of rubber 9 or the like is seated in each holder, and it will be noticed that the body 6 of each holder is substantially cup shaped, having upstanding flanges at its sides and at its ends and being of considerably greater width than the arms. The block is seated in the cup shaped body between the arms, and it will be noticed, referring to Fig. 4, that each block is rounded on its upper face from one arm 7 to the other.

Each block is also provided with transverse openings 10 for increasing resilience, and a T-headed eyebolt 11 extends through each block, the body of each holder having an opening through which the eye of the bolt extends. This eye 12 is elongated as shown, and the head 13 of the bolt is shaped to fit over the top of the block, as shown in Fig. 4.

A hanger 14 of flexible non-metallic material, as, for instance, leather or the like, is connected with the eye, the said hanger being in the form of a loop of two thicknesses of leather doubled to form the loop, thus making four thicknesses of the leather at the body of the loop and two thicknesses where it engages the eye. The lower end of each hanger is connected with a loop 15 on the inner frame 2, and the inner frame which carries the body of the vehicle is thus suspended from the outer frame connected with the chassis by flexible resilient, non-metallic hangers, which effectually interrupt metallic vibrations which would otherwise pass upwardly from the chassis to the body.

The body has its sole support from the non-metallic hangers and these hangers are cushioned at their upper ends by the blocks of rubber. Thus a completely non-metallic, flexible support is provided. The layers of the hanger are preferably secured together in any suitable or desired manner, as, for instance, by stitching.

When the car is moving on the road the shock and jar coming upwardly from the ground contact will frequently overcome the downward or gravity pressure of the body and cause it to jump. Thus for the moment the pressure at the apex of the block of rubber will be relieved and its natural resiliency will return it to its natural shape. The strap changes from tension to non-tension in unison with the cushioning of the block of rubber.

This non-metallic cushioning function which is like the cushioning of the pneumatic tire at the ground contact will be constant whenever the car is in motion on the road. The inner frame is to be so installed that its top surface will ride slightly, say two or three inches, above the outer frame, so that the inner frame will respond to the flexible action of the blocks of rubber and strap hangers without the body clashing against the outer frame. The buffers which are placed between the frame effectually cushion the main frame against metallic vibration.

The improved connections are not shown at the forward part of the frames, the seat of the power plant, but it is obvious that they would be arranged at such points. At such points the hangers may be arranged as shown in Fig. 1 or they may be arranged on the frames as pendants, in the manner shown in Fig. 9.

In the embodiment of the invention shown in Figs. 5 to 8, inclusive, the frame arrangement is the same, an outer frame 16 being connected to the axles by the usual spring, while the inner frame 17, which carries the body, is suspended from the outer frame. The outer frame carries the pillars 18 corresponding to the pillars 3, and each series is connected by a longitudinally extending bar 19.

A series of casings 20 is secured to the cross bar by bolts and nuts 21 and each casing is open at its bottom as shown. A wheel 22 is journaled in each casing on a bolt 23, and each wheel is annularly grooved as shown and carries a pneumatic tire 24. The casings 20 are arranged in pairs, one member of each pair being at each side of the vehicle, and the members of the pairs are in register.

Below each pair a shaft 25 is journaled transversely of the frame 17 on the under side thereof in bearings 26, and each end of each shaft is provided with wheels similar to the wheels 22—24, as indicated at 27. Each of these wheels 27 is directly below a wheel 22—24, and a hanger 28 connects each of the wheels 27 with the adjacent wheel 22—24, the hanger being in the form of an endless belt passing over the wheels. Each belt is of leather or like material, and is of suitable weight and thickness to properly support the load.

The operation of the construction shown in Figs. 5 to 8 is precisely the same as that shown in Figs. 1 to 4, the body being supported by flexible non-elastic, non-metallic hangers from the chassis.

In Fig. 9 there is shown an embodiment of the invention wherein a suitable form of support for the front of the vehicle, at the power plant, is provided. This arrangement may be used in both Fig. 1 and Fig. 5, if desired, or in each case the form of hangers shown may be continued at the front. The form shown in Fig. 9 is preferable in some respects because it does not extend so high above the power plant. With this arrangement, the outer frame, indicated at 30, carries pillars 31, which support a longitudinally extending bar 32 corresponding to the bars 4 and 14 of Figs. 1 and 5, respectively.

The holders or housings 33 correspond to the holders 6—7 of Fig. 1, and the hangers 34 correspond to the hangers of Fig. 1, each hanger being connected at its top to the eye of the bolt 35 and at its bottom to a loop 36 on the inner frame.

It will be understood that the location of the neutralizing devices, namely, the flexible non-metallic hangers, is secondary, since they will operate wherever they are placed, the only essential being that they are so installed that the vibrations passing from the wheels to the body must reach the neutralizing devices before reaching the body. They will dissolve and absorb the vibrations, making them harmless regardless of whether they are attached below or above the body.

Figure 10:
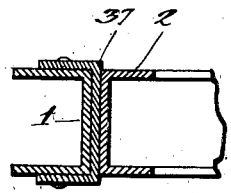
Figs. 10 and 11 are detail sections through the frame showing cushioning mechanism.
Figure 11:
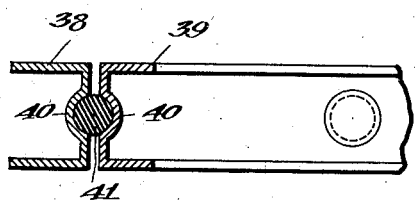
Figure 12:
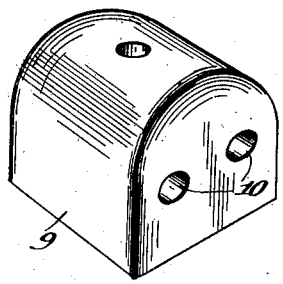
Fig. 12 is a perspective view of the block.
Figure 13:
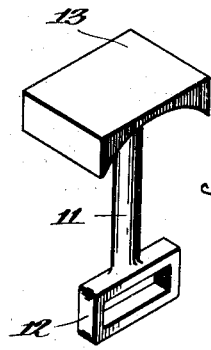
Fig. 13 is a perspective view of the T-headed eyebolt.

In Figs. 10 and 11 there is shown cushioning mechanism for cushioning the frames against each other and for preventing clashing. With this arrangement a strip 37 of felt or the like is secured to one frame, in the present instance the outer. The strips are arranged between the adjacent sides of the frames and between the adjacent ends at suitable intervals. Or, if desired, the frames 38 and 39 may have registering recesses 40 at suitable points within which are held balls 41 of resilient material, as, for instance, rubber.

I claim:

1. A device for controlling shock in motor vehicles comprising inner and outer substantially rectangular frames, the inner frame being adapted to support the body and the outer frame being adapted for connection with the springs of the vehicle, and a flexible non-metallic connection between the inner and the outer frames for supporting the said inner frame near the level of the outer frame, said connection comprising pillars extending up from the outer frame, housings supported by the pillars, elastic blocks carried by the housings, and a flexible non-metallic strap for each housing connected at one end to the block and at the other to the inner frame, each block having a vertical opening, an eye-bolt in each opening and having a head engaging above the block and the eye below the block to which the strap is connected.

2. A device for controlling shock in motor vehicles comprising inner and outer substantially rectangular frames, the inner frame being adapted to support the body and the outer frame being adapted for connection with the springs of the vehicle, a flexible non-metallic connection between the inner and the outer frames for supporting the said inner frame near the level of the outer frame, said connection comprising pillars extending up from the outer frame, housings supported by the pillars, elastic blocks carried by the housings, and a flexible non-metallic strap for each housing connected at one end to the block and at the other to the inner frame, each block having a vertical opening.

3. A device for controlling shock in motor vehicles comprising inner and outer substantially rectangular frames, the inner frame being adapted to support the body and the outer frame being adapted for connection with the springs of the vehicle, a flexible non-metallic connection between the inner and the outer frames for supporting the said inner frame near the level of the outer frame, said connection comprising pillars extending up from the outer frame, housings supported by the pillars, elastic blocks carried by the housings, and a flexible non-metallic strap for each housing connected at one end to the block and at the other to the inner frame.

4. A device for controlling shock in motor vehicles comprising inner and outer substantially rectangular frames, the inner frame being adapted to support the body and the outer frame being adapted for connection with the springs of the vehicle, a flexible non-metallic connection between inner and outer frames for supporting the said inner frame near the level of the outer frame, said connection comprising pillars on the outer frame, flexible straps connected at their lower ends to the inner frame and at their upper ends to the pillars, and a rubber block interposed between each strap and its connection with the pillars.

5. A device for controlling shock in motor vehicles comprising inner and outer substantially rectangular frames, the inner frame being adapted to support the body and the outer frame being adapted for connection with the springs of the vehicle, a flexible non-metallic connection between inner and outer frames for supporting the said inner frame near the level of the outer frame, said connection comprising pillars on the outer frame, and flexible straps connected at their lower ends to the inner frame and at their upper ends to the pillars.

6. A device for controlling shock in motor vehicles comprising inner and outer frames, the inner frame being adapted to support the body and the outer frame for connection with the springs of the vehicle, and flexible non-metallic connections between the frames for supporting said frames near the same level, said connection extending above and below the frames.

CHARLES B. BILLINGHURST.